Dec. 1, 1964 O. B. BERLINGS 3,159,357
PHOTOGRAPHIC FILM CASSETTES
Filed Sept. 14, 1962 3 Sheets-Sheet 1

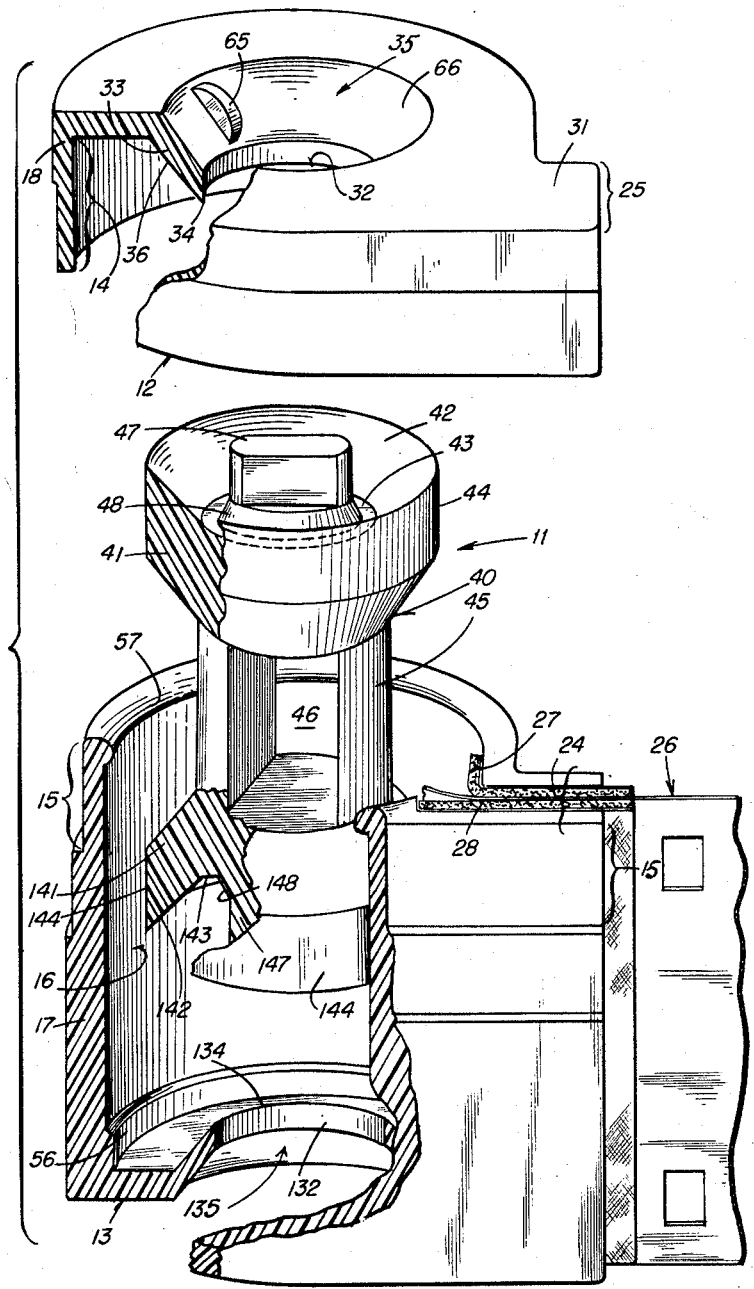
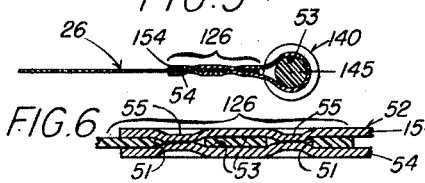
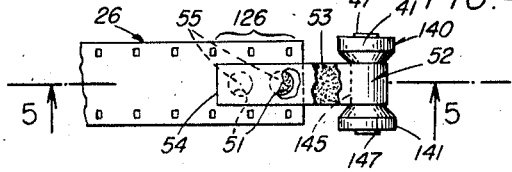

Dec. 1, 1964  O. B. BERLINGS  3,159,357
PHOTOGRAPHIC FILM CASSETTES
Filed Sept. 14, 1962  3 Sheets-Sheet 3
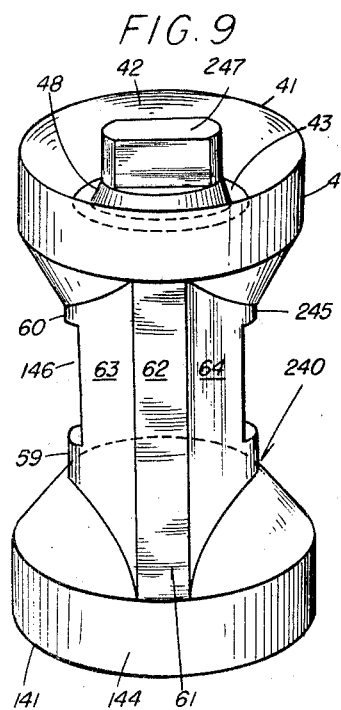
FIG. 9
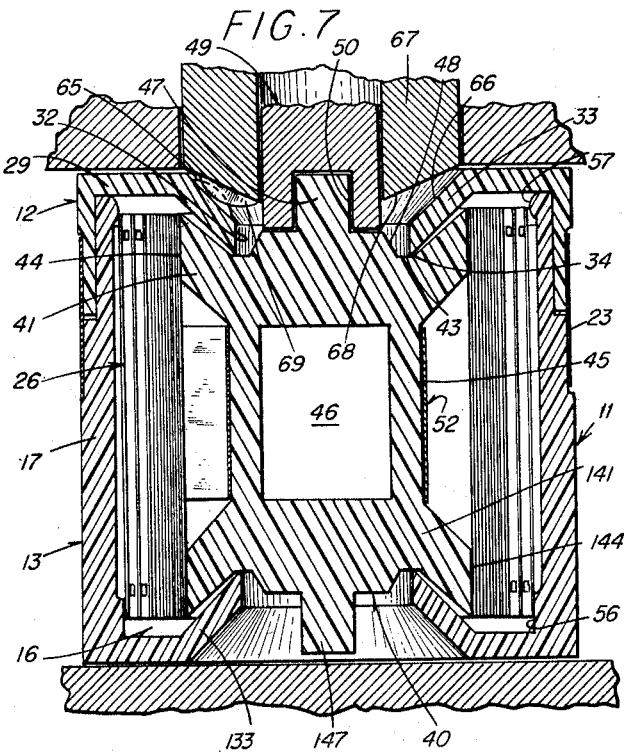
FIG. 7
FIG. 8
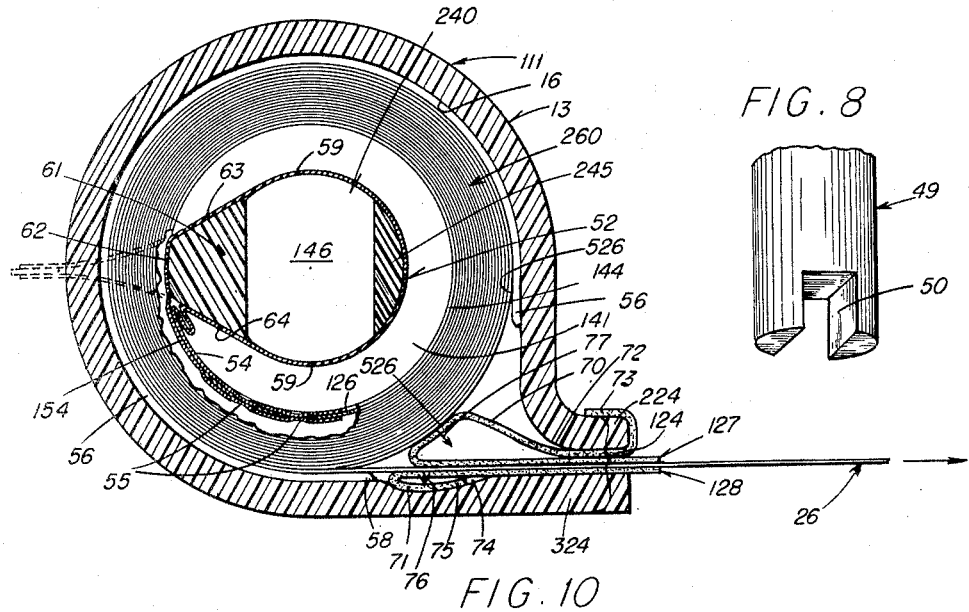
FIG. 10

3,159,357
PHOTOGRAPHIC FILM CASSETTES
Orests B. Berlings, 7501 Ridge Blvd., Brooklyn 9, N.Y.
Filed Sept. 14, 1962, Ser. No. 223,615
15 Claims. (Cl. 242—71.1)

The present invention relates to cassettes for storage of strips of photographic film and for supply of the latter in raw stock form therefrom in cameras during successive exposures of frames thereof and for respooling or rereeling such exposed film strips thereinto.

A general object of the present invention is to provide such photographic film cassettes which consist of a minimum number of readily and economically produced and easily assembled parts, which assure light-tightness, and each of which includes a housing in which a film storage spool is rotatably mounted in a unique manner assuring a minimum of frictional drag therebetween while avoiding projecting elements to simplify and minimize berth space in cameras occupied thereby.

Another object of the present invention is to provide embodiments of such cassettes which permit efficient pay-out therefrom and rereeling thereinto of film strips without tendency to scratch the medial zones thereof occupied by the successive series of image or picture frames.

A further object is to provide such cassettes with simple but unusually effective film strip anchorage means for effective anchorage of the film strips to the cassette spools while being easily applied, without tendency unduly to weaken the film strips at any points.

Still another object of the present invention is to provide spools of such cassettes in unusual forms which facilitate their mounting in the cassette housings and the anchorage of the film strips thereto in a manner assuring enhanced effectiveness of and trouble-free draft of the latter into the housings.

A still further object of the invention is to provide structural embodiments of the device which are readily constructed and assembled in mass production and which permit efficient use and operation thereof.

Other objects of the invention will in part be obvious and will in part appear hereinafter.

The invention accordingly comprises the features of construction, combinations of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is an exploded perspective view, with parts broken away and in section, of the embodiment of the cassette illustrated in FIGS. 1 and 2, showing a section of strip film leading through a film passage to the film storage chamber therein;

FIG. 4 is a view substantially to scale of a spool similar to that illustrated in FIGS. 1 to 3 incl. and anchoring means of the present invention which fastens an end of the strip of film to the spool;

FIG. 5 is a sectional view taken substantially on line 5—5 of FIG. 4;

FIG. 6 is an enlarged sectional detail of fastening means illustrated in FIG. 5, showing anchorage of the fastening strip to an end section of the strip of film;

FIG. 7 is an axial section of the cassette illustrated in FIGS. 1 to 3 incl., showing the mount thereof in a berth of a camera and with the cassette loaded with a strip of film arranged in successive turns about the spool, means also being illustrated in section (with parts broken away) of means rotatably to drive the spool and further means to employ for film identification;

FIG. 8 is a perspective view, with parts broken away, of means illustrated in FIG. 7 for rotatably driving the spool;

FIG. 9 is a perspective view of a different embodiment of the spool to be employed in the housing of cassettes of the type illustrated in FIGS. 1 to 7 incl.; and FIG. 10 is a transverse section of a cassette of the present invention employing the spool of FIG. 9, and illustrating the use therewith of a type of film strip anchorage illustrated in FIGS. 4 to 6 incl. and a modified form of light trap at the tangential film passage.

Figure 1:
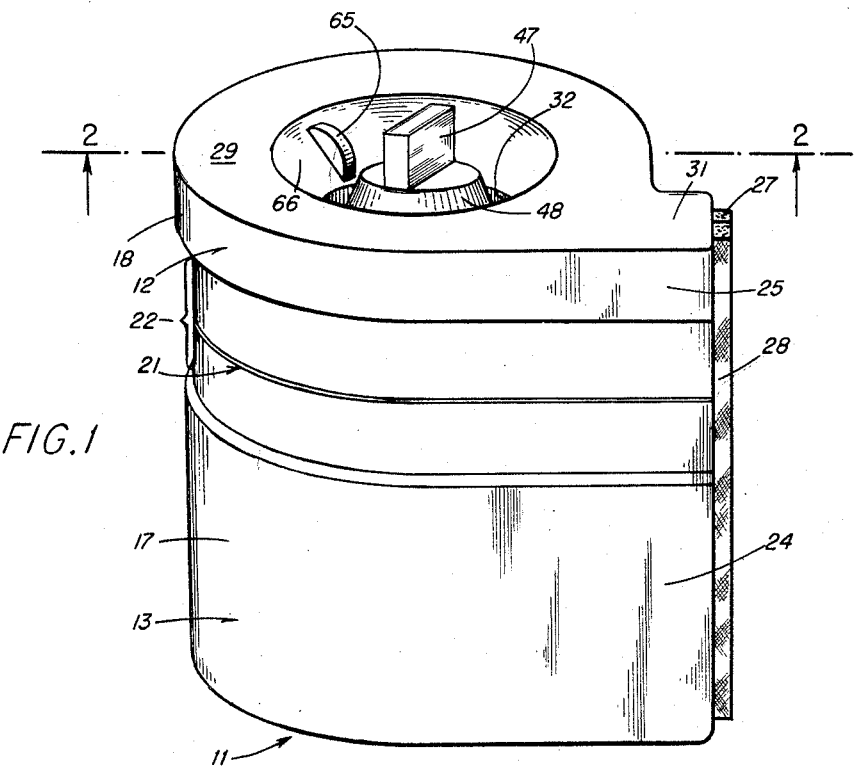
FIG. 1 is a perspective view to enlarged scale of an embodiment of the film cassette of the present invention, with certain fastening means to secure housing parts together being omitted for clarity.
Figure 2:
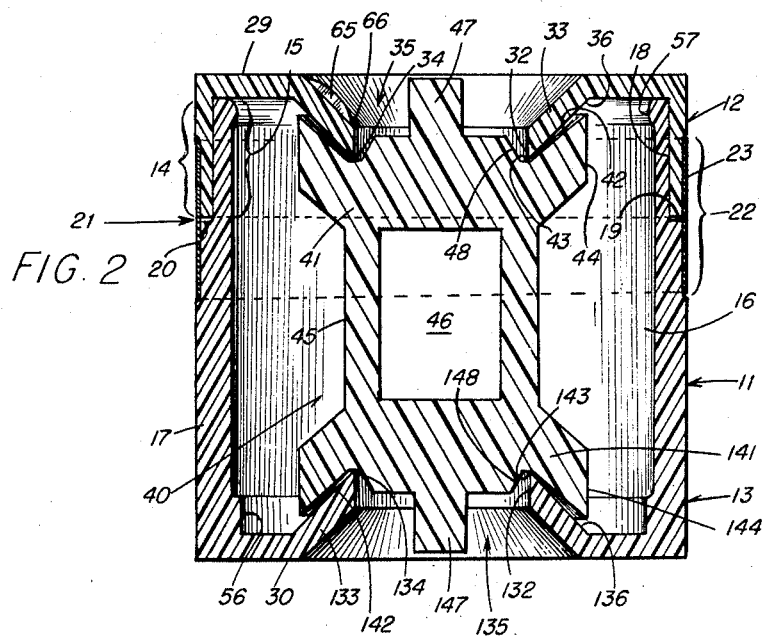
FIG. 2 is an axial section taken substantially on line 2—2 of FIG. 1 while having added thereto the housing parts fastening means omitted from the latter.

Referring to the drawings, in which like numerals identify similar parts throughout, it will be seen that an embodiment of the cassette of the present invention, as illustrated in FIGS. 1 to 3 incl. and 7, may include a housing 11 formed of a pair of cup-shaped shells 12 and 13 respectively having opposed arcuate side marginal zones 14 and 15 telescoped together in lapping relations, as will be understood from FIG. 2. It will be noted that in the embodiment of FIGS. 1 to 3 incl. and 7 that the two cup-shaped shells 12 and 13 together form a substantially cylindrical film storage chamber 16 in housing 11, and that the arcuate side wall 17 of shell 13 extends substantially the full length or axial dimension of this film storage chamber. The opposed cup-shaped housing shell 12 preferably is much shallower than shell 13, having only a relatively narrow arcuate side wall 18 substantially of the depth of the arcuate side marginal zone 14 which telescopes over and laps the top arcuate side marginal zone 15 of the side wall 17 of the companion shell 13. The arcuate side wall 17 of shell 13 is stepped to provide an arcuately-extending shoulder 19 opposed to the bottom end edge 20 of lapping side wall 18 of top shell 12. As a result, shoulder 19 and side wall bottom edge 20 form a transverse line of juncture 21.

While the opposed lapped faces of depending side wall 18 of top shell 12 and the top marginal zone 15 of the bottom shell 13 provide a substantially light-tight joint it is preferred to assure light-tightness at the juncture 21 by providing shell sides 18 and 17 with an outside channel 22 extending axially to opposite sides of the line of juncture. A strip 23 of adhesive tape having the inner face thereof coated with adhesive is seated in the channel 22 to cover the line of juncture 21 in a light-tight seal. The provision of the transverse arcuate channel 22 not only serves as a ready guide for laying down the sealing tape properly over the juncture 21, but further assures that the tape does not extend beyond the outer surfaces of the shell side walls 17 and 18 to be damaged or pulled away when rubbed against or contacted by other objects or structure. The sealing tape 23 also anchors the two shells 12 and 13 together while permitting ready separation thereof, if desired, by merely stripping away this tape from out of channel 22.

The cassette of FIGS. 1 to 3 incl. and 7 also includes means defining a film passage which extends tangentially to the film storage chamber 16. Such means may be in the form of a tangentially extending U-shaped lip 24 on the side wall 17 of bottom shell 13 and a somewhat similar tangential U-shaped lip 25 on shell side wall 18, with the second shorter U-shaped lip having an interior width at least as great as the exterior width of the U-shaped lip 24 in the marginal zone 14. Thus, inverted U-shaped lip 25 will snugly seat down over the top edge of upright U-shaped lip 24, together to define therebetween a tangential slot leading to the film storage chamber 16 for passage of a strip of raw stock film, such as that of which a piece is shown at 26 in FIG. 3. The opposed side walls of the legs of the U-shaped lip 24 preferably are lined with strips 27 and 28 of suitable light-excluding material, between opposed faces of which film strip 26 is longitudinally translated out of and reversely into film storage chamber 16.

Transverse end walls 29 and 30 of shells 12 and 13 preferably are of similar structure and shape, being substantially circular except for the tangential projection (seen at 31 in FIGS. 1 and 3) formed as a result of the provision of the complementary tangential U-shaped lips 24 and 25 which together define the film egress and ingress passage. The transverse end walls 29 and 30 are respectively provided with a central aperture 32 and 132, each circumscribed by an axially and inwardly-extending annular flange 33 and 133. Each of the annular flanges 33 and 133 terminates at its inner end in a circular line-of-contact means 34 and 134, which may be in the form of a circular sharp edge, as is shown in FIGS. 2 and 3. Preferably, each of the axially inwardly-extending annular flanges 33 and 133 is in the form of a frusto-conical section of its respective circular end wall 29 or 30, so that the space therewithin and cylindrical hole 32 or 132 associated therewith together form a funnel-shaped space 35 and 135. With the annular oblique inward face 36 or 136 of frusto-conical flange 33 or 133 disposed at, for example, an angle of about 45° to the axis of the housing 11, the circular sharp edge 34 or 134 will be flanked by a cylindrical side wall that defines hole 32 or 132 and the frusto-conical inner face 36 or 136 line elements of which are arranged at substantially the same 45° angle.

The cassette of FIGS. 1 to 3 incl. and 7 includes a film storage spool 40 rotatably mounted in the chamber 16 and having transverse ends 41 and 141. The transverse ends 41 and 141 are each provided with in inwardly-extending, coaxial recess 42 and 142, respectively. The annular flanges 33 and 133 are respectively loosely telescoped into the spool end recess 42 and 142. Each of the spool end recesses 42 and 142 has therein an annular lateral surface 43 and 143, respectively, with which the contact means of the annular flanges 33 and 133 make virtual line contact with minimum frictional engagement, e.g., the circular sharp edges 34 and 134. While the annular lateral surfaces 43 and 143 in the bottoms of the spool end recesses 42 and 142 are shown in the embodiment of FIGS. 1 to 3 incl. and 7 (see e.g., FIG. 2) to be annular ribbons or bands of a plane surface extending transversely or substantially normal to the axis of the spool each, of course, may be a marginal zone of a circular bottom surface when driving stem means (hereinafter described) are omitted. It will also be understood that the desired virtual line contact between the opposed inner end of the annular flange 33 or 133 and the bottom annular surface 43 or 143 may be attained if one substitutes for the circular sharp edge 34 or 134 a crowned annular surface, provided the annular lateral surface 43 or 143 is also crowned in opposed relation, so that when one is abutted to the other they meet in virtual circular line contact.

Preferably each of the spool end recesses 42 and 142 has its outer side in the shape of a frusto-conical surface and arranged in opposed relation to the inner frusto-conical side surfaces 36 or 136 of the annular flanges 33 or 133 nested therein. The slope of the frusto-conical outer side surface of each of the spool end recesses 42 or 142 preferably is greater than that of the opposed frusto-conical inner side face 36 or 136 of the associated annular flange 33 or 133, thereby providing an intervening annular space wedge-shaped in cross-section converging axially inward toward the line of opposed contact between annular sharp edge 34 and annular lateral surface 43, or between edge 134 and annular surface 143. For example, a line element of either of the oblique faces of the spool end recesses 42 and 142 may be arranged at an angle of about 48° to the longitudinal axis of the spool 40. As will be seen from FIG. 2, film storage spool 40 is rotatably confined between the opposed annular flanges 33 and 133 of the cup-shaped housing shells 12 and 13, within the cylindrical chamber 16 thereof, and is spaced inwardly on all lateral sides from the housing side walls to define therebetween an annular film storage space.

The film storage spool 40 has, as shown in FIGS. 2 and 3, enlarged transverse ends 41 and 141, each respectively circumscribed by a cylindrical surface 44 and 144, and with these enlarged transverse ends intervened by a coaxially-arranged, reduced diameter barrel section or constricted waist 45. As is known from certain practices in the camera and film cassette art, the strip of film, such as that shown at 26 in FIG. 7, is not intended to be laid down on or snugly about the cylindrical barrel 45, but to be wrapped about the enlarged transverse ends 41 and 141 with its marginal zones (in which such film strip may carry series of claw or sprocket tooth perforations) supported upon the cylindrical surfaces 44 and 144 thereof, serving as axially-spaced annular lands (as will be understood from FIG. 7). While the cylindrical barrel 45 of film storage spool 40 may be solid a transverse slot 46 may be formed therethrough in order to conserve material, and it may be employed by certain users of the present invention to anchor an end of a film strip therein when suitable cooperative means are provided for this purpose.

The film storage spool 40 preferably is provided with spool-driving means located in at least one of the spool end recesses 42 and 142 and engageable through the adjacent housing end wall aperture or hole 32 or 132 by suitable camera-supported rotary drive means. In order to avoid complications in assembling operations which would otherwise require care in proper orientation of spool ends, the opposite ends of film storage spool 40 preferably are like, so that the spool structure is symmetrical. Thus, in certain embodiments both ends of the spool 40 may be provided with spool-driving means in the form of axially-extending stems 47 and 147 around the respective roots of which are arranged the annular lateral bearing or contact surfaces 43 and 143. As will be seen in the drawings, opposite sides of each of the stems 47 and 147 may be flatted off so that it is in the shape of a tongue which is readily engageable by a rotary driving member, to rotate the film storage spool 40 for taking up thereon in succesive turns a strip of film. Preferably each of the stems or tongues 47 and 147 is of a transverse dimension or width appreciably less than the diameter of the holes 32 and 132, so as to be readily insertable therein during assembly operations. Also, the root section of each of the stems 47 and 147 preferably is frusto-conical, as is indicated at 48 and 148, so as readily to center the stems therein while providing for relatively small radial width of the annular lateral bearing surfaces 43 and 143 to limit slop or rotary eccentricity of the film storage spool 40 within the housing chamber 16 during rotation of the former in the winding of the film strip 26 thereon. It will thus be seen that each of the frusto-conical root sections 48 and 148 of the respective spool stems 47 and 147 has its oblique annular face sloping axially inward and laterally outward to the annular lateral bottom surface 43 or 143 of the surrounding recess 42 or 142.

Let it be assumed that the cassette 11 is to be loaded with a strip 26 of raw stock film of a certain type, such as black and white or color, and of a certain ASA speed, so that the cassette will serve as a supply means to deliver the film to camera mechanism for exposing successive frames thereof. In exposing the successive frames of the raw stock film strip 26 it may be collected progressively in a take-up cassette, which may either have a driven take-up spool therein or be of the injection type so that the film is pushed therein into a roll of successive turns as it is translated across the camera gate by suitable intermittent translating means. After so exposing the successive frames of the raw stock film strip 26 and collecting the latter into a roll in the take-up cassette it may then be rewound back upon the film storage spool 40 of cassette 11, by suitably rotating this spool from cooperative camera-supported driving means engaging either of the driving stems 47 and 147. As will be seen from FIGS. 7 and 8, such driving means may be in the form of a rotary shaft 49 having a transverse slot 50 in the bottom end thereof which is receptive of the flat stem tongue 47 for rotation of the film storage spool 40 thereby.

In order that the first turn of the successive turns of the film strip 26 may be securely anchored to the constricted waist or reduced diameter barrel 45 or 145 of rotatable spool 40 or 140, the film anchoring means shown in FIGS. 4 to 7 incl. may be employed. Such means may include an end section 126 of the film strip 26 having at least one hole 51 therein. Two such holes 51 are illustrated in the structure depicted in FIGS. 4 to 6 incl. This anchoring means also includes a strip of adhesive tape 52 having only one adhesive coated face 53, which is lapped about the spool barrel 145 for adhesive anchorage thereto. The strip of adhesive tape 52, after being medially lapped about the spool barrel 145, is doubled back upon itself with the opposed ends 54 and 154 thereof extending in lapped relation to opposite sides of the film end section 126 with coverage thereby of the hole or holes 51 in the latter. It will be seen from FIG. 6 that the opposed adhesive faces 53 reach through to mutual contact of each other through the holes 51 in the film end section 126 for secure adherence to each other in area 55, so as securely to anchor an end of the film strip 26 to the spool barrel 145 (or 45). This film anchoring means avoids tapering by trimming an end of the film strip which can be a costly operation and which, incidentally, may weaken this end of the film to tend to cause breakage thereof when the so-formed tapered tongue or tab is employed for anchorage of an end of the film to the spool by insertion in a slot in the latter, for winding and unwinding a roll of the film in the frame exposing operation and preparation of the exposed film roll for transportation to a processing plant.

It will thus be understood, and particularly with reference to FIGS. 4 to 7 incl., that the film storage spool 40 does not reel up the film strip 26 directly upon the spool barrel or constricted waist (45 or 145) between end flange structures 41 and 141. Actually the marginal zones of the film strip 26 are laid down in successive turns about the circular lands 44 and 144 of the end flange structures 41 and 141, to bridge across the annular channel defined by the constricted waist or reduced diameter barrel (45 or 145). Only the film strip anchoring tape 52 is wrapped directly about the latter. A number of advantages are attained as a result of such structure and employment thereof. Contact of the raw stock film with the spooling construction is limited to marginal zones of the former. Providing the reduced diameter barrel or constricted waist (45 or 145) conserves material from which the spool (40 or 140) is made, as does the provision of the cross slot 46 in spool 40 which may serve no operating function. The reduced diameter barrel or constricted waist (45 or 145) also provides means about which anchoring tape 52 may be lapped or wrapped to serve as the means for anchoring the end of the film strip 26 to the spool (40 or 140) without undue interference with the coiling of the film strip thereabout. If, for example, the cassette of FIG. 7 is designed and dimensioned for storage of 16 mm. strip film therein the longitudinal distance between the outside edges of the annular lands 44 and 144 will be approximately 16 mm. In such case, the axial length of the reduced diameter barrel or constricted waist may be about ¼", and the slot 46 may be of similar dimension in the direction of the axis of the spool.

In order to limit contact between the film strip 26 and inner surfaces of the cassette chamber 16, or drag of the former against the latter, cup-shaped shell 13 preferably is provided at opposite ends of the film storage chamber with arcuate inside lands or ribs, such as beads 56 and 57, in the bottom and at the mouth of this shell. The marginal zones of the film strip 26, one or both of which carry a series of claw or sprocket engaging perforations, and which flank the medial zone in which the image frames are to be exposed, alone are dragged in contact with cassette housing structure, i.e., at the arcuate lands 56 and 57, in the spooling up and unspooling of the successive turns of the film strip. While FIG. 10 illustrates a modified form of a cassette with respect to the spool structure and light trap at the film inlet passage thereof, the housing is of a construction similar in other respects to that illustrated in FIG. 7. It will be seen from FIG. 10 that arcuate bottom land or rib 56 is interrupted at the tangential film passage defined by U-shaped lip 24, and is provided with a rounded leading nose 58 against which one marginal zone of the film strip 26 will slide to direct it to the inside face of this arcuate land or rib in the formation of each turn of the roll of film spooled up on storage spool 40. Arcuate top land or rib 57 is interrupted in similar manner for a like reason.

In employing the film strip anchoring tape means disclosed in FIGS. 4 to 7 incl., it will be understood that if the material-conserving slot 46 is provided the full axial length of the constricted waist or reduced diameter barrel 45, edges of this anchoring tape may nest in opposite mouths of this cross slot to extend in substantially parallel flat planes thereacross, rather than to track further linearly around arcs of a circle of the diameter of the barrel. This may be avoided by making the cross slot 46 of less length axially of the spool, such as is proposed with respect to cross slot 146 in FIGS. 9 and 10, thereby defining circular lands 59 and 60 at opposite ends of this cross slot, on which marginal zones of the anchoring tape 52 will seat. FIGS. 9 and 10 also illustrate means whereby the doubled back lapping of the anchoring tape 52 may be carried out radially to a circle aligned with the cylindrical surfaces of the film-supporting lands 44 and 144, so that pull will be applied to the end section 126 of the film strip 26 in alignment with these lands to prevent intermediate warpage thereof. As is proposed in FIGS. 9 and 10, this may be accomplished by providing a longitudinal rib 61 on one side of the constricted waist or reduced diameter barrel 245. Preferably this longitudinal rib 61 extends between the circular lands 44 and 144 for mergence therewith, as will be understood from FIG. 9. Also, the longitudinal rib 61 has its outer longitudinal face 62 substantially aligned with the transverse circular faces of the lands 44 and 144 and with opposite side faces 62 and 63 thereof merged smoothly with the adjacent faces of the barrel 245 and converging radially outward toward each other. The adhesive tape strip 52 will thus have its lapped back ends 54 and 154 lying smoothly against the rib faces 63 and 64 and converging radially outward to the curved outer rib face 62 over which tape and 154 laps to extend tangentially along a circle of a diameter of that of the circular lands 44 and 144, so that the anchored end section 126 of the film strip is located therealong in alignment with these circular lands on which the film marginal edges are to seat.

In my copending application for film Cassette and Camera Therefor, Serial No. 863,028, filed December 30, 1959, and now abandoned, I have disclosed certain film identification structure which will permit the particular type of film stored in the loaded cassette, either black and white or color, to be identified through an indicator window in a wall of the camera casing, and also to permit the speed (ASA number) of the particular film to be identified therethrough, while permitting the identifying means to indicate when the cassette is emptied as indicative of exposure of the last frame of the film strip. As is therein disclosed, such film identification mechanism may include a rotary indicator dial carrying in sectors thereof the identifying indicia suitably supported upon a drivable shaft which may be associated with suitable gearing and spring biasing rotatably to translate it back and forth. Such drivable shaft may carry an eccentrically located feeler projection for engagement of certain identification abutment means on the cassette housing at a predetermined position, so that when the latter is engaged by the feeler projection the indicator dial will properly inform one through the indicator window of the type and speed of the film housed in the loaded cassette. For this purpose, embodiments of the cassette of the present invention may be provided with such identification abutment means in the form of a projection or lug 65 mounted on the frusto-conical outer face 66 of the inwardly-extending end flange 33 and within the end recess 35 defined by the latter. A rotatably driven shaft of the indicator mechanism may, as will be seen from FIG. 7, be in the form of a cylindrical sleeve 67 having a tapered or frusto-conical lower end 68 extending into the frusto-conical end recess about the spool drive stem 47. This rotatable indicator sleeve 67 carries on its lower end 68 a cooperating feeler projection or lug 67 (that may be called a "finger"), which in rotation of the sleeve 67 will abut against the identification lug 65 of the cassette. The radial location of the identification lug 65 within the end recess 35 of the cassette housing or top shell 12 thereof determines the indicia which will be exposed in the indicator window. For example, identification lug 65 may be located at 36° from a zero position for proper identification of black and white film having a speed of ASA 25. For black and white film of a speed ASA 50 identification or feeler lug 65 would be located at 72°, for ASA 160 at 108°, ASA 160 at 144° and for ASA 400 at 180°. The remaining 180° would be employed for color film, for ASA 25 lug 65 would be located at 216°, for ASA 32 at 252°, for ASA 64 at 288°, for ASA 80 at 324° and for ASA 160 at 360°.

It will be noted that the recessed end section 35, defined in the end wall 29 of the top cup-shaped shell 12 by inwardly-extending frusto-conical flange 33, assures that no spool structure, such as the rotating stem 47 (and that defined by the inwardly-extending frusto-conical flange 133 with respect to spool stem 147), as well as the feeler lug 65 for the identification mechanism, do not extend axially beyond the ends of the cassette housing, thus allowing the cassette-receiving berth provided in the camera to be of minimum dimensions and simple contour. The take-up cassette to be mounted in the camera on the opposite side of the exposure gate may be of the injection type having a cylindrical chamber communicated to the exterior by a tangential film passage, so that the leading end of the film as it is translated across the gate for successive exposures of the frames thereof may be pushed thereinto step-by-step. In such an arrangement, after the film strip has been translated across the exposure gate, frame-by-frame, with the exposed film being coiled up in a spiraled roll into the injection take-up cassette and with the trailing end of the strip of film remaining anchored to the spool barrel of the present cassette, the exposed film strip may then be rereeled about the spool 40 into the cassette housing 11 by rotary drive of the spool from the rotating slotted driving shaft 49.

While the three major parts of the present cassette consisting of the cup-shaped housing shells 12 and 13 and the film storage spool 40 (or 140, or 240) may be readily manufactured by die-casting suitable metal, preferably it is molded from a suitable thermo-plastic or thermo-setting synthetic resin composition, such as a high-impact polystyrene. The material selected for the formation of these die-cast or molded parts of the present cassette will have appreciable rigidity, but in thin-walled section will be sufficiently resilient as to permit the interior annular bead or rib 57 to be stripped out of a core groove, particularly when this bead or rib has a crowned surface or is semicircular in cross-section as is proposed in the drawings.

In FIG. 10 is illustrated in modified form a light-trap at the film egress and ingress passage. Previously, light-traps have been formed by lining with black strips of felt, velours or flock paper the inside faces of the tangential passage through which the film strip is translated. The use thereof introduces difficulty since such materials shed excessive amounts of lint which tend to foul up surfaces of the film strip. In the development of the present invention it has been found that such lint shedding is reduced to a practical limit if the light-excluding strips are formed of sheet composition formed of matted long fibers appreciably compacted together, such as the type of stock from which blotting paper is made or compacted long fiber filter paper. Such compositions desirably reduce the materials costs. As is proposed in FIG. 10, the light-trap of film passage lip 124 may be uniquely improved by providing such light-excluding strips 127 and 128 respectively with lapped back, reversed loops 70 and 71. For this purpose, the inside face of lip leg 224 may have a longitudinally-extending relieved portion 72 at the inner end of the film translating passage against which may seat the lapped back end portion of light-excluding strip 127 beyond or outward of the loop 70 of the latter. While the lapped back end portion of strip 127 may be anchored at the relieved portion 72 by suitable adhesive secure anchorage thereof may be enhanced by extending this end portion along the adjacent face of the film translating passage to behind the remainder of this strip beyond loop 70 to anchorage of cassette structure exterior of the passage. As shown in FIG. 10 this purpose is accomplished by bringing the terminal end 73 out through the passage and wrapping it around the longitudinal end edge of lip leg 224, for secure anchorage thereto by intervening cement. For like purpose, the inside face of lip leg 324 may be relieved, such as by being provided with a longitudinally-extending, curved, shallow relieved portion or recess 74 into which lapped back end 75 of strip 128 is seated or anchored; and this recess may be desirably shaped to nest loop 71 therein when the latter is flattened or crushed partially by drag of the film strip thereagainst. When the film strip 26 is fed between the light-excluding strips 127 and 128, loop 71 of the latter is flattened partially in the direction of the arrow 76 into the recess 74, and the outside turn, e.g., 526, of the roll 260 of the film 26 in storage chamber 16 drags against and pushes radially outward on light-excluding strip loop 70, in the direction of the arrow 77, thereby bulging this loop and increasing the contact between it and the outside film turn as well as between opposed faces of this loop and the film section extending out through the passage. The loop 70 will be progressively bulged in this fashion as successive turns of the film strip are coiled up about the spool 240. Inherent springiness of the loops 70 and 71 assures snugging of faces thereof to faces of the film strip. Consequently, opposed portions of the light-excluding strips 127 and 128 are snugly biased to opposite faces of the film strip located therebetween with effective exclusion of light from the film storage chamber 16.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described by invention, what I claim as new and desire to secure by Letters Patent is:

1. A photographic film cassette comprising, in combination, a pair of cup-shaped shells having opposed arcuate side marginal zones telescoped together in lapping relation with each provided with a centrally-apertured transverse end wall and cooperatively serving as a film roll housing having a substantially cylindrical chamber, means on said housing defining a film passage extending tangentially to the chamber, each of said end walls having one of a pair of opposed axially inwardly-extending annular flanges arranged about the central aperture therein and terminating in an inner end provided with an axially inwardly-extending circular edge contoured to provide only a circular line of contact against an opposed annular transverse bearing surface, a film storage spool rotatably mounted in the chamber having transverse ends each provided with an inwardly extending coaxial recess into which one of said annular flanges loosely telescopes without side wall jamming and drag with said recess having therein the annular substantially transverse bearing surface with which the inwardly-extending line contact edge of this annular flange makes virtual line contact with minimum frictional engagement, said annular transverse bearing surface of said spool end being flanked on one radial side thereof by a circular recess side wall extending outward in a generally axial direction to limit a lateral movement of said spool end relative to said line contact edge, with contact between said inwardly-extending annular shell flange and the cooperating spool end being limited to said annular transverse surface by appreciable annular spacing between said shell flange and recess side wall except at the juncture of the latter with said annular transverse bearing surface, said spool being rotatably confined between the opposed line contact end edges of said opposed annular shell flanges coaxially within the chamber and spaced inwardly on all lateral sides from said housing to define therebetween an annular film storage space, and spool-driving means located in one of said spool end recesses engageable through the adjacent housing end wall aperture by camera-supported rotary drive means.

2. The cassette as defined in claim 1 characterized by said line contact edge of each of said inwardly-extending annular shell flanges being wedge-shaped in radial section with termination in a sharp edge and with the radially outer surface of said shell flange being frusto-conical with axially-inward slope and the opposed annular outer side wall of the associated spool recess being of similar frusto-conical shape, the slope of the latter relative to the spool axis being greater than that of the opposed outer surface of said associated annular shell flange thereby providing the appreciable annular spacing as an intervening annular space, wedge-shaped in cross-section and converging axially inward toward the line of opposed contact between said sharp edge and opposed annular transverse bearing surface.

3. The cassette as defined in claim 2 characterized by said spool-driving means being in the form of a stem projecting axially outward through one of said housing end wall apertures into the space circumscribed by the associated frusto-conical annular flange with the annular transverse surface of the associated spool recess defining the bottom of the latter about the root of said stem.

4. The cassette as defined in claim 3 characterized by said spool being symmetrical with like stems on both ends each terminating short of the outer side of the space circumscribed by the annular flange into which it projects.

5. The cassette as defined in claim 4 characterized by each of said stems being of appreciably less transverse dimension than that of the aperture through which it projects for ready insertion with the root of said stem being frusto-conical and having its oblique annular face sloping laterally outward in the axially-inward direction to said annular transverse bottom bearing surface of the surrounding recess with the side wall of the aperture spaced radially outward from the frusto-conical stem root.

6. In a photographic film cassette a film storage spool provided with transverse ends in the form of axially-spaced annular enlargements having circular surfaces serving as seating lands for marginal zones of a strip of film of certain width coiled up thereabout and an intervening reduced diameter barrel coaxially arranged therebetween, and means anchoring one end of the film strip to said barrel comprising an end section of such film of certain thickness having a large hole provided therein medially of the side edges of said film strip end section and a strip of adhesive tape having only one adhesive coated face lapped about said barrel and doubled back upon itself with the ends extending in lapped relation to opposite sides of the film end section and with coverage of the large medial hole in the latter, the large medial hole in the film strip end section being of such transverse dimensions and said adhesive tape being of such thickness and flexibility as to be readily distortable transversely in the appreciable area covering the hole from either side into the hole to at least one half the certain thickness of the film strip end section, the adhesive coated face of said tape being located on the inner side of said doubled back strip of tape and contacting said barrel and opposite sides of said film strip end section with the opposed adhesive coated areas of the inside faces of the ends of the tape covering the large medial hole on opposite sides extending through this hole to adhered contact of each other in appreciable opposed areas thereof, with the inside turn of the coiled film strip bridging said barrel and the mid-section of said anchoring adhesive tape which is lapped about the latter.

7. The film storage spool and anchoring means as defined in claim 6 characterized by said barrel having a longitudinal rib of appreciable radial depth on one side extending longitudinally between said circular lands with portions of the mid-section of said strip of adhesive tape flanking opposite sides of said rib and with the longitudinal outer edge of the latter serving as a pull point offset radially from the axis of said spool an appreciable distance approaching the diameter of said circular lands.

8. The film anchoring means as defined in claim 7 characterized by said rib having its longitudinal outer edge provided with a longitudinally-extending outer face substantially aligned with the transverse circular faces of said lands and with the opposite side faces of said rib merged smoothly with the adjacent faces of said barrel and converged radially outward.

9. A photographic film cassette comprising, in combination, a pair of cup-shaped shells having opposed side marginal zones telescoped together in lapping relation with each provided with a centrally-apertured transverse end wall and cooperatively serving as a film roll housing having a substantially cylindrical chamber, means on said housing defining a light-tight film passage extending tangentially to the chamber, each of said end walls having a frusto-conical section arranged about the central aperture therein and extending axially inward in opposed relation to that of the other end wall with the inner end of each frusto-conical section terminating in one of a pair of axially-spaced and opposed axially inwardly-extending circular sharp edges and with the space circumscribed by each of said sections being funnel-shaped, and a symmetrical film storage spool coaxially mounted in the chamber with each end thereof being provided with a frusto-conical recess with its oblique side wall converging axially inward and having a stem located centrally in the bottom thereof extending axially outward through the central aperture in the opposed housing end wall into the funnel-shaped space in the outer side of the latter with one of said frusto-conical sections nested in this spool recess without side face contact with the opposed side wall of the recess and with the sides of each stem being free of contact with the side funnel-shaped surface of the shell frusto-conical section into which it extends, each of said spool recesses having an annular transverse surface circumscribed about the root of the stem and engaged as an annular transverse bearing surface by line contact with the inner circular sharp edge of the frusto-conical section nested in this recess, said spool being rotatably confined between the opposed pair of circular sharp edges with the slope of the annular outer side wall of each spool recess relative to the spool axis being greater than that of the opposed face of the frusto-conical section nested therein to provide an intervening annular space wedge-shaped in cross-section which converges axially inward toward the line of opposed contact limiting contact between said housing and said spool to the bearing contact of the sharp edges of the opposed frusto-conical shell sections against said annular transverse bearing surfaces of the opposite ends of said spool.

10. A photographic film cassette comprising, in combination, a pair of cup-shaped shells having opposed arcuate side marginal zones telescoped together in lapping relation with each provided with a centrally-apertured transverse end wall and cooperatively serving as a film roll housing having a substantially cylindrical chamber, means on said housing defining a film passage extending tangentially to the chamber, each of said end walls having one of a pair of opposed axially inwardly-extending annular flanges arranged about the central aperture therein and terminating in an inner end provided with an axially inwardly-extending circular edge contoured to provide only a circular line of contact against an opposed annular transverse bearing surface, a film storage spool rotatably mounted in the chamber having transverse ends each provided with an inwardly extending coaxial recess into which one of said annular flanges loosely telescopes without side wall jamming and drag with said recess having therein the annular substantially transverse bearing surface with which the inwardly-extending line contact edge of this annular flange makes virtual line contact with minimum frictional engagement, said annular transverse bearing surface of said spool end being flanked on one radial side thereof by a circular recess side wall extending outward in a generally axial direction to limit lateral movement of said spool end relative to said line contact edge, with contact between said inwardly-extending annular shell flange and the cooperating spool end being limited to said annular transverse surface by appreciable annular spacing between said shell flange and recess side wall except at the juncture of the latter with said annular transverse bearing surface, said spool being rotatably confined between the opposed line contact end edges of said opposed annular shell flanges coaxially within the chamber and spaced inwardly on all lateral sides from said housing to define therebetween an annular film storage space, spool-driving means located in one of said spool end recesses engageable through the adjacent housing end wall aperture by camera-supported rotary drive means, each of said axially inwardly extending annular flanges defining in its outer side a funnel-shaped space, and an indicator shoulder for engagement by film identification mechanism fixedly carried by the outer face of one of said annular flanges within the funnel-shaped space defined thereby.

11. In a photographic film cassette a housing having a generally cylindrical film storage chamber therein and means defining a longitudinally-extending film passage slot in a side of said chamber extending substantially tangentially therefrom, said slot defining means comprising a pair of opposed substantially parallel flat faces with an outer one thereof extending tangentially from the inner cylindrical wall of the chamber and the opposed face arranged at an angle of appreciably less than 180° to the adjacent inner cylindrical wall of the chamber, a section of light-excluding fibrous strip material anchored to and lining said tangential face, and another section of light-excluding fibrous strip material having an outer end anchored to and lining the opposed flat face with a portion of the latter section extending inwardly through the slot into said chamber and therein forming within the throat of the slot an open enlarged springy loop having its sides appreciably spaced, unsecured and floating free with a portion beyond the loop being fixedly held whereby a strip of film drawn outward between the opposed sections of lining strip material will tend to drag the free loop into the throat of the slot and jam it against the inside face of the film strip being withdrawn out of the slot to force the outside face of the film strip against the opposed section of lining strip material with consequential application of drag to both side faces of the film strip and attendant exclusion of passage of light through the slot into said chamber.

12. The cassette and its light excluding means as defined in claim 18 in which said sections of light-excluding fibrous material are in the form of a pair of strips with the inner end of each strip being bent back upon itself within said chamber and behind the remaining portion thereof with the latter extending out through the slot to provide the opposed face linings, one of said bent back strip ends providing said open enlarged free-floating springy loop and the other locating on said tangential face an opposed open free-floating springy loop with the springiness of the resulting pair of free loops causing opposed sides thereof to tend to approach each other and press against opposite faces of the film strip as it travels therebetween.

13. The cassette as defined in claim 12 characterized by each of said opposed faces of the film passage being provided with a longitudinally-extending relieved portion at the inner end of the slot defined therebetween, the inner end portion of each of said looped light-excluding strips being seated against one of said relieved portions and with the remaining portion of this strip beyond the loop located in front of the so-seated end portion and extending outwardly through the passage in snug contact with one face of the film strip.

14. The cassette as defined in claim 13 characterized by one of said relieved portions being in the form of a curved recess in which the inner end portion of the adjacent first light-excluding strip and the loop of the latter both seat, the inner end portion of the opposite second light-excluding strip extending through the opposite relieved portion along the adjacent face of said passage behind the remaining portion of this second strip beyond the loop of the latter to anchorage of cassette structure exterior of the passage.

15. The cassette as defined in claim 13 characterized by each of said light-excluding strips being formed of sheet material composed of matted long fibers appreciably compacted together.

References Cited in the file of this patent

UNITED STATES PATENTS

| | | |
|---|---|---|
| 2,153,573 | Kinloch | Apr. 11, 1939 |
| 2,476,996 | Nebel | July 26, 1949 |
| 2,484,248 | Roehrl | Oct. 11, 1949 |
| 2,571,796 | Ulmschneider et al. | Oct. 16, 1951 |
| 2,719,679 | Nerwin et al. | Oct. 4, 1955 |
| 2,762,280 | VonLewis | Sept. 11, 1956 |
| 2,983,462 | Berlings | May 9, 1961 |

FOREIGN PATENTS

| | | |
|---|---|---|
| 210,878 | Great Britain | Feb. 11, 1924 |

UNITED STATES PATENT OFFICE
CERTIFICATE OF CORRECTION

Patent No. 3,159,357                                December 1, 1964

Orests B. Berlings

It is hereby certified that error appears in the above numbered patent requiring correction and that the said Letters Patent should read as corrected below.

Column 1, line 45, for "construction" read -- constructions --; column 3, line 36, for "in" read -- an --; column 4, line 47, for "succesive" read -- successive --; line 58, strike out "the", third occurrence; column 6, line 57, for "and" read -- end --; column 11, line 52, for "inwardly extending" read -- inwardly-extending --; column 12, line 19, for the claim reference numeral "18" read -- 11 --; lines 54 and 55, for "compaced" read -- compacted --.

Signed and sealed this 20th day of April 1965.

(SEAL)
Attest:

ERNEST W. SWIDER
Attesting Officer

EDWARD J. BRENNER
Commissioner of Patents